US007186952B2

(12) United States Patent
Degand et al.

(10) Patent No.: US 7,186,952 B2
(45) Date of Patent: Mar. 6, 2007

(54) HEATABLE GLAZING PANEL WITH ELECTRICALLY CONDUCTIVE COATING HAVING BOTH HEATABLE AND NON-HEATABLE COATED ZONES

(75) Inventors: Etienne Degand, Jumet (BE); Christope Meerman, Jumet (BE); Eddy Catot, Jumet (BE)

(73) Assignee: Glaverbel, Jumet (BE)

( * ) Notice: Subject to any disclaimer, the term of this patent is extended or adjusted under 35 U.S.C. 154(b) by 0 days.

(21) Appl. No.: 10/516,890

(22) PCT Filed: Jun. 4, 2003

(86) PCT No.: PCT/EP03/50212

§ 371 (c)(1), (2), (4) Date: Dec. 3, 2004

(87) PCT Pub. No.: WO03/105532

PCT Pub. Date: Dec. 18, 2003

(65) Prior Publication Data

US 2005/0178756 A1 Aug. 18, 2005

(30) Foreign Application Priority Data

Jun. 5, 2002 (EP) ................................. 02077254

(51) Int. Cl.
*B60L 1/02* (2006.01)

(52) U.S. Cl. ...................... 219/203; 219/202; 219/522; 219/543; 392/438; 392/439

(58) Field of Classification Search ................ 219/203, 219/522, 543, 202; 338/306–309; 392/438–439; 52/171.2
See application file for complete search history.

(56) References Cited

U.S. PATENT DOCUMENTS 2,557,983 A * 6/1951 Linder ........................ 219/543
2,878,357 A * 3/1959 Thomson et al. ........... 338/292
3,313,920 A * 4/1967 Gallez ........................ 219/522
3,475,588 A * 10/1969 McMaster ................... 219/203
3,982,092 A * 9/1976 Marriott ..................... 219/203
4,119,425 A * 10/1978 Marriott ...................... 65/107
5,466,911 A * 11/1995 Spagnoli et al. ............ 219/203
6,492,619 B1 * 12/2002 Sol ............................ 219/203
6,538,192 B1 3/2003 Coster et al.
6,559,419 B1 * 5/2003 Sol et al. .................... 219/203
6,670,581 B1 * 12/2003 Degand et al. ............. 219/203
6,703,586 B1 * 3/2004 Kast ........................... 219/203
6,734,396 B2 * 5/2004 Sol et al. .................... 219/203
6,797,389 B1 9/2004 Depauw (Continued)

FOREIGN PATENT DOCUMENTS

DE 198 60 870 7/2000
EP 609141 * 8/1994

(Continued)

*Primary Examiner*—Robin O. Evans
*Assistant Examiner*—Leonid M. Fastovsky
(74) *Attorney, Agent, or Firm*—Akerman Senterfitt

(57) ABSTRACT

The present invention relates to an electrically heatable glazing panel comprising a substantially transparent, electrically conductive coating layer which is adapted to be electrically heatable and is divided into a plurality of zones, some heatable and some non-heatable. The glazing panel according to the invention is preferably a side window which may be used for de-misting or de-icing purposes.

20 Claims, 3 Drawing Sheets

U.S. PATENT DOCUMENTS

| | | | |
|---|---|---|---|
| 6,838,181 B1 | 1/2005 | Degand | |
| 2002/0015824 A1 * | 2/2002 | Kawamoto et al. | 428/156 |

FOREIGN PATENT DOCUMENTS

| | | | |
|---|---|---|---|
| GB | 2 186 769 | | 8/1987 |
| GB | 1 051 777 | | 12/1996 |
| GB | 2381179 | * | 4/2003 |
| WO | 91/10564 | * | 7/1991 |
| WO | WO 00/29346 | | 5/2000 |
| WO | 00/72635 | * | 11/2000 |
| WO | WO 00/72634 | | 11/2000 |
| WO | WO 01/27050 | | 4/2001 |
| WO | WO 02/07967 | | 1/2002 |
| WO | WO 03/105533 | | 12/2003 |

* cited by examiner

HEATABLE GLAZING PANEL WITH ELECTRICALLY CONDUCTIVE COATING HAVING BOTH HEATABLE AND NON-HEATABLE COATED ZONES

CROSS-REFERENCE TO RELATED APPLICATIONS

This application is the entry into the U.S. National Stage of PCT Application No. PCT/EP03/50212 filed Jun. 4, 2003, and claims priority from European Application No. 02077254.7 filed Jun. 5, 2002, the disclosures of both of which are hereby incorporated by reference.

BACKGROUND

The present invention relates to an electrically heatable glazing panel.

In the case of heatable glazing panels comprising an electrically conductive coating layer and being of substantially regular shape, for example rectangular shape, electrical current is brought to a conductive coating layer through, for example, metallic bus bars, which are substantially parallel one to another. In this particular case the distance between the bus bars along their whole length remains substantially the same. The electrical resistance of the current path along the length of the bus bars is therefore substantially the same. When submitting such glazing panels to a given voltage, the amount of heat generated will be substantially uniform throughout the whole surface of the glazing panel covered with the conductive coating layer.

In the case of heatable glazing panels of substantially irregular shape, for example glazing panels with application in the automotive, railway or aeronautical field, bus bars may diverge at at least one portion along their length. The distance between the bus bars therefore varies and consequently the electrical resistance of the current path also varies. Therefore, when submitting such glazing panels to a given voltage, the amount of heat generated will vary along the length of the bus bars, thereby creating the risk of local areas of overheating which may damage or destroy the conductive coating layer. Furthermore, when such heatable glazing panels are used for de-misting or de-icing purposes, certain areas may de-mist or de-ice more rapidly than others. This may create problems of visibility for an observer looking through such a glazing panel.

SUMMARY

According to one aspect, the present invention provides a heatable glazing panel with active and passive coated zones.

Various alternative and/or preferred aspects of the invention are described below.

The term “diverging” as used herein refers to bus bars which are substantially non-parallel along at least part of their lengths.

When applying a voltage across the coating layer of the glazing panel according to the invention via the first and second bus bars, the temperature may be substantially the same across all active and passive coated zones without the presence of significant local areas of overheating. This may be assessed, for example, by comparing the average temperature at one 5 $cm^2$ area of the glazing panel and comparing this with the average temperature at another, spaced 5 $cm^2$ area of the glazing panel, particularly when the glazing panel has been heated for a sufficient length of time for it to reach a stable or equilibrium temperature with its surroundings.

The passive coated zone which is adapted to be substantially non-heatable electrically may be arranged so that when a voltage is applied across the bus bars, no electrical current passes through this zone. Alternatively, a small electrical current may pass through this zone, for example by way of leakage, but at an intensity which does not significantly heat this zone, particularly compared with the heating effect caused by the passage of electrical current through the active coated zone.

Both the passive and the active zones are covered with the electrically conductive coating layer. Preferably, the electrically conductive coating layer is provided at at least 50% and more preferably at at least 60%, 70%, 75%, 80% 85%, 90% 95% or 98% of the total surface area of the glazing panel.

SUMMARY

Arranging the coating layer over a significant or major portion of the surface of the glazing panel as referred to above and arranging the coating layer into passive and active coated zones may facilitate the production of a heatable glazing panel having a substantially harmonious visual appearance across it entire surface.

In embodiments in which the glazing panel comprises at least one active coated zone and two passive coated zones these may be arranged such that the first active coated zone is positioned between the first and second passive coated zones. The first active zone is preferably adjacent to the first passive zone. Heat generated by passage of electrical current through the active coated zone may be dissipated towards the adjacent passive coated zone or zones. Appropriate choice of the size, configuration and position of the active and passive coated zones may allow a substantially similar temperature to be achieved across the active and passive coated zones despite the fact that it is only the active coated zone which is actively heated by passage of electrical current. For example, the variation of temperature across at least two adjacent active and passive coated zones, more preferably across all active and passive zones of the glazing panel, may be less than 15° C. and preferably less than 12° C., 10° C., 8° C., 5° C. or 2° C. particularly when a voltage is applied across the coating layer of the glazing panel via first and second bus bars and after the glazing panel has reached stable or equilibrium conditions with its surroundings, the surroundings being at room temperature. In a particular embodiment of the glazing panel, the average temperature across all electrically heatable zones once equilibrium conditions have been reached is of about 40° C.

In some embodiments of the present invention there are at least 2, 4, 5, 8, 10, 15, 20, 25, 30, 45, 50 or 100 passive coated zones and at least 2, 4, 5, 8, 10, 15, 20, 25, 30, 45, 50 or 100 active coated zones. Preferably, the passive and active coated zones are interspaced across the entire, across the majority, or across at least part of the surface of the glazing; the passive and active coated zones may be arranged in stripes or strips across the surface of the glazing.

Preferably, the passive and active coated zones are delimited by one or more zone boundaries which are substantially insulating. The expression “substantially insulating” as used herein refers to a zone boundary which is less electrically conductive than the coating layer or which is substantially non conductive of electrical current. Therefore, the zone boundary may act as a barrier to electrical current between the active and passive zones.

A zone boundary may be provided by applying pattern wise over the conductive coating layer a material which is less conductive than the coating layer. Preferably, zone boundaries are provided by one or more non-coated portion of the glazing panel. The one or more non-coated portion may have an electrical resistance such that substantially no electrical current flows through it when a voltage is applied between the bus bars and thus may be substantially not conductive. The one or more non-coated portion may be provided by applying pattern wise to the substrate a masking agent before depositing the electrically conductive layer and removing subsequently the masking agent covered with the coating layer. Alternatively, the one or more non-coated portion may be provided by removal of the conductive coating layer after deposition. Advantageously, the coating layer may be removed with a laser, for example a laser DIODE. The zone boundaries may be substantially invisible to the naked eye, particularly if formed by laser removal of part of the coating layer. Advantageously, the width of the zone boundary is less than 150 μm, preferably less than 100 μm, more preferably less than 50 μm, most preferably less than 10 μm.

In a preferred embodiment, the first bus bar is provided adjacent to an upper edge of the glazing panel and the second bus bar is provided adjacent to a lower edge of the glazing panel.

Advantageously, the active and passive coated zones are provided in the form of strips having substantially parallel sides along their lengths. This may facilitate the flow of electrical current from first to second bus bars in the electrically heatable active zones and/or may facilitate propagation of heat from the active to the passive zones.

Preferably, the passive coated zone has a width of less than 20 mm, more preferably less than 10 mm and most preferably less than 5 mm. Advantageously, the width of the active zone is less than or equal to ten times the width of its adjacent passive zone.

Arranging for the ratio (surface area of passive coated zone/surface area of adjacent active coated zone) to be greater at portions of the glazing panel where the bus bars are close together in comparison to that at portions of the glazing panel where the bus bars are further apart may facilitate a control of temperature across different portions of the glazing panel. This may be particularly useful where the active and passive coated zones are provided in the form of strips or bands. The ratio (surface area of passive coated zone/surface area of adjacent active coated zone) is preferably less than 10, for example of 8, 7 or 6, most preferably less than 5, 4, 3 or 2.

Arranging at least 50% of the surface area of the coating layer to comprise active coated zones may provide a good compromise between the visibility through and the aesthetic aspect of the glazing panel, and a quantity of heat generated sufficient to achieve de-misting and/or de-icing of the glazing panel.

The first and second bus bars may be formed by deposition of a noble metal paste, for example a silver paste, or by deposition of a metallic ribbon, for example a copper ribbon, or by any other method.

In use, the polarity of each of the bus bars may remain the same when a voltage is applied between the bus bars.

Arranging the electrically conductive coating layer to be a solar control coating layer may enable the functions of preventing excessive passage of solar energy through the glazing to be combined with heatability of the glazing panel. The term "solar control" refers to a coating layer that increases the selectivity of a substrate, that is increases the ratio of incident visible light transmitted through a substrate to the incident solar energy transmitted through the substrate. The conductive coating layer may be a low emissivity coating.

The conductive coating layer may be deposited by a vacuum deposition technique, for example by magnetron sputtering. Alternatively, the coating layer may be pyrolytically formed, for example by chemical vapour deposition or formed in some other way. The coating layer is preferably present over the entire surface or at least over substantially the entire surface or over the majority of the surface of the substrate.

In one preferred embodiment of the present invention, the coating layer comprises at least one metallic infra-red reflective layer. The coating layer may comprise a sequence of layer as follows: dielectric layer/silver/dielectric layer or dielectric layer/silver/dielectric layer/silver/dielectric layer. The dielectric layers may comprise, for example, tin oxide, zinc oxide, silicon nitride, titanium oxide, aluminium oxide or mixtures of one or more thereof.

The electrically conductive coating layer preferably has a resistance comprised between 2 and 100 ohms per square, preferably between 2 and 25 ohms per square, for example, 2.2, 3.0, 15 or 20 ohms per square.

In the glazing panels according to the present invention, the substrate may be glass, for example a sheet of flat glass, soda lime glass or float glass, particularly a sheet of flat glass intended for subsequent use as or incorporated in an architectural or vehicle glazing panel. It may undergo a thermal toughening treatment or a bending treatment before or after the coating layer has been deposited onto at least part of its surface. Alternatively, the substrate may be a rigid or flexible plastics sheet material which may equally be intended for subsequent use as or incorporated in an architectural or vehicle glazing panel.

The present invention is particularly applicable to a glazing panel of substantially irregular shape, that is, a glazing panel which has an acute angle $\alpha$ formed by the lower edge of the glazing panel and by the tangent to a side edge, particularly where $\alpha$ is less than or equal to 60°, 55°, 45°, 40°, 35°, 30°, 25°, 20° or 15° and even more particularly where the first and second bus bars are positioned along or adjacent to those edges. The glazing panel may be an automotive side window or a side window of a vehicle or a train, a windshield of an aircraft or a glazing panel with applications in the nautical field.

The glazing panel may be adapted to have a voltage of between 10 and 100 volts applied across the bus bars, preferably between 30 and 50 volts. Particularly for automobile applications, a voltage of 32 volts, more preferably 36 volts, most preferably 42 volts, is applied. Alternatively, the glazing panel may be adapted to have a voltage of between 10 and 14 volts applied across the bus bars, preferably about 12 volts. The heat generated by the active zone heatable electrically is preferably comprised between 250 and 750 watts per square meter.

In embodiments in which more than one pair of spaced bus bars are provided, the glazing panel may be adapted to have the same or substantially the same voltage applied across each pair of bus bars.

Particularly where the glazing panel is provided in monolithic form, the electrically conductive coating layer may be partially or entirely covered with an additional external coating (which is preferably substantially non electrically conductive), for example a lacquer. This may prevent the electrically conductive coating from being an exposed coating layer and may serve:

to provide electrical insulation between the electrically conductive coating and its surroundings; and/or to protect the electrically conductive coating from abrasion; and/or to reduce tendencies for the electrically conductive coating and/or the zone boundaries to accumulate dirt and/or to become difficult to clean.

BRIEF DESCRIPTION OF THE FIGURES

The invention will now be described, by way of example only, with reference to.

DETAILED DESCRIPTION

Figure 1:
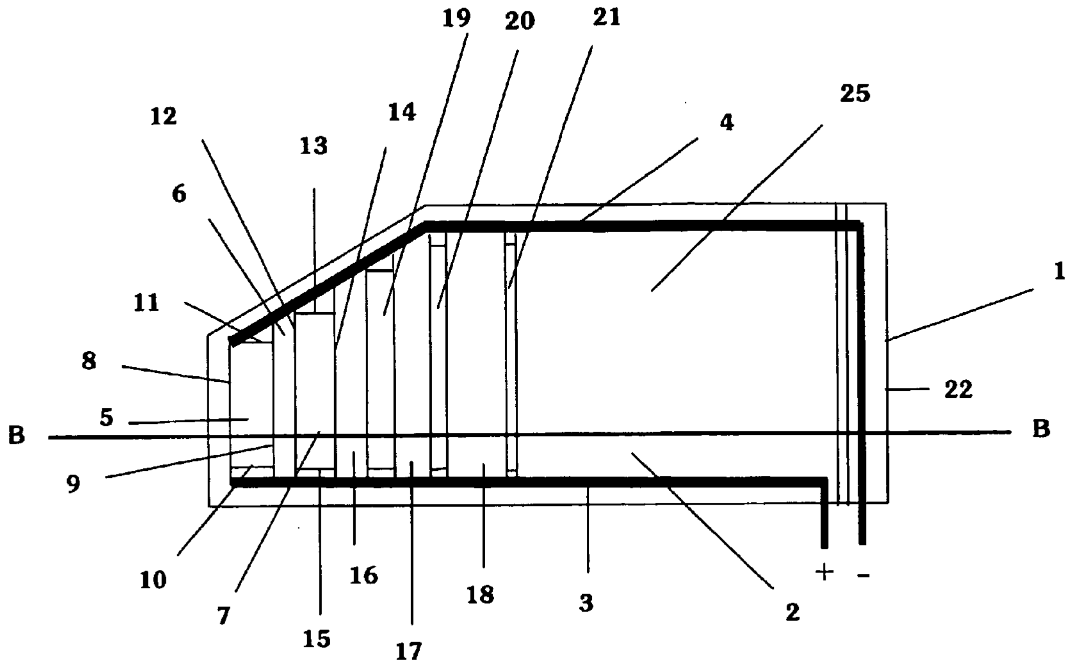
FIG. 1, which is a schematic representation of a glazing panel.

FIG. 1 shows a glazing panel (22) comprising a glass sheet (1), a substantially transparent, electrically conductive coating layer (2), a first bus bar (3), a second bus bar (4), a first passive zone of the coating layer which is adapted to be substantially non-heatable electrically (5), a first active zone of the coating layer which is adapted to be electrically heatable (6), a second passive zone of the coating layer which is adapted to be substantially non-heatable electrically (7) and insulating zone boundaries (8), (9), (10), (11) (12), (13), (14) and (15). FIG. 1 shows additional active zones adapted to be electrically heatable (16), (17), (18) and (25), and additional passive zones adapted to be non-heatable electrically (19), (20) and (21). All of these zones are delimited by insulating zone boundaries.

Figure 2:
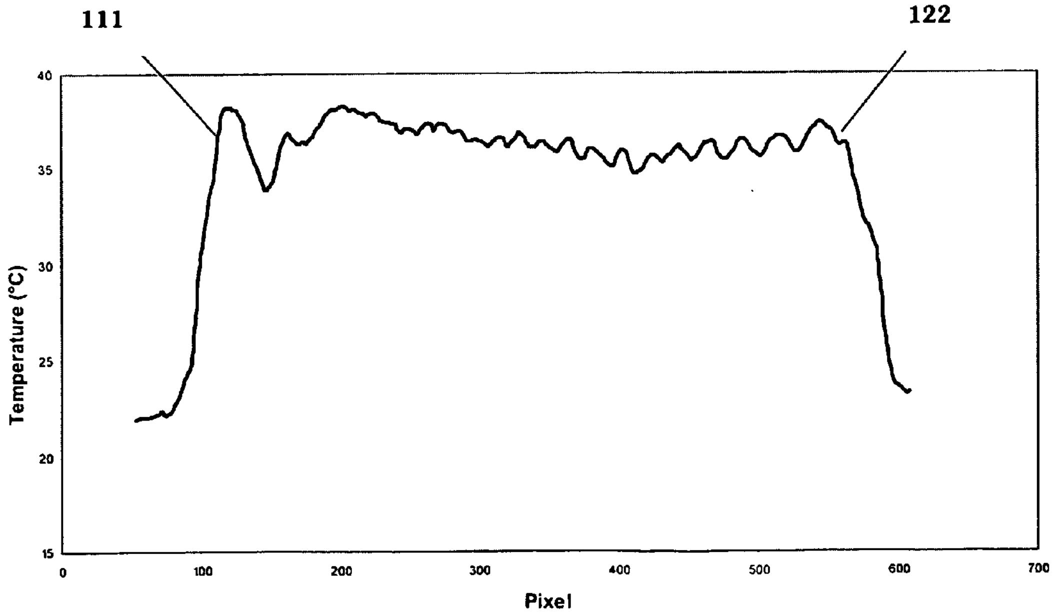
FIG. 2, which is a graph of the temperature distribution across a glazing panel.

FIG. 2 shows a diagram of the temperature of the glazing panel measured along line BB at the surface of the glass sheet on which the coating film is deposited of FIG. 1 when the glazing panel (22) has been subjected to a voltage of 42 V across its bus bars for 9 minutes. The temperature is measured by image treatment of a thermograph as a function of the number of pixel. Point (111) represents the temperature measured in ° C. for passive coated zone (5) and point (122) represents the temperature measured in ° C. for active coated zone (25). Other points of the diagram comprised between points (111) and (122) represent the temperatures measured for the other active and passive zones of FIG. 1.

The glazing panel (22) may be produced as follows.

A glass sheet having a surface substantially covered by an electrically conductive film having a resistance of 15 ohms per square is cut to the dimensions of a side window of an automobile.

The zone boundaries are subsequently traced using a DIODE type laser and using three successive passages of the laser, each passage having a width of 70 μm with an overlap of 45 μm so that the insulating zone boundaries have a total width of 120 μm.

The insulating zone boundaries delimit:

a first passive zone (5) adapted to be non-heatable electrically which has a width of 10 mm an adjacent, first active zone (6) adapted to be heatable electrically which has a width of 1.4 mm an adjacent, second passive zone (7) adapted to be non-heatable electrically which has a width of 10 mm and so on so as to form about 28 additional passive zones which are adapted to be substantially non-heatable electrically, for example zones (19), (20) and (21), and about 28 additional active zones which are heatable electrically, for example zones (16), (17) and (18), which zones alternate with each another. These zones are formed substantially in the portion of the glazing panel where the bus bars diverge.

The widths of the active and passive zones are given in table I as a function of the distance between first bus bar (3) and second bus bar (4). Values of the ratio of the surface of the passive non-heatable zone to the surface of the adjacent active heatable zone are given in table I.

First and second bus bars are formed by screen-printing a layer of silver paste of 10 μm thickness and 5 mm width, followed by deposition of a layer of enamel 15 μm thickness to mask the silver paste layer.

The glazing panel is then tempered to form a heat treated, monolithic glazing panel.

TABLE I

| Distance between first and second bus bars [mm] | Width of passive (non-heatable) zone [mm] | Width of active (heatable) zone [mm] | Ratio (surface area passive zone/surface area of adjacent active zone) |
|---|---|---|---|
| 150 | 10 | 1.4 | 7.3 |
| 155 | 10 | 1.5 | 6.8 |
| 160 | 10 | 1.6 | 6.3 |
| 165 | 10 | 1.7 | 5.9 |
| 170 | 10 | 1.8 | 5.5 |
| 175 | 10 | 2.0 | 5.1 |
| 180 | 10 | 2.1 | 4.8 |
| 185 | 10 | 2.2 | 4.5 |
| 190 | 10 | 2.4 | 4.2 |
| 195 | 10 | 2.6 | 3.9 |
| 200 | 8 | 2.2 | 3.7 |
| 205 | 8 | 2.3 | 3.4 |
| 210 | 8 | 2.5 | 3.2 |
| 215 | 8 | 2.6 | 3.0 |
| 220 | 8 | 2.8 | 2.9 |
| 225 | 8 | 3.0 | 2.7 |
| 230 | 8 | 3.2 | 2.5 |
| 235 | 8 | 3.4 | 2.4 |
| 240 | 8 | 3.6 | 2.2 |
| 245 | 8 | 3.8 | 2.1 |
| 250 | 8 | 4.0 | 2.0 |
| 255 | 8 | 4.3 | 1.9 |
| 260 | 8 | 4.5 | 1.8 |
| 265 | 8 | 4.8 | 1.7 |
| 270 | 8 | 5.1 | 1.6 |
| 275 | 8 | 5.4 | 1.5 |
| 280 | 8 | 5.8 | 1.4 |
| 285 | 8 | 6.2 | 1.3 |
| 290 | 8 | 6.6 | 1.2 |
| 295 | 8 | 7.0 | 1.1 |
| 300 | 8 | 7.4 | 1.1 |
| 305 | 8 | 7.9 | 1.0 |
| 310 | 8 | 8.5 | 0.9 |
| 315 | 8 | 9.1 | 0.9 |
| 320 | 8 | 9.7 | 0.8 |
| 325 | 8 | 10.4 | 0.8 |
| 330 | 8 | 11.2 | 0.7 |
| 335 | 8 | 12.1 | 0.7 |
| 340 | 8 | 13.0 | 0.6 |
| 345 | 8 | 14.1 | 0.6 |
| 350 | 6 | 11.5 | 0.5 |
| 355 | 6 | 12.5 | 0.5 |
| 360 | 6 | 13.6 | 0.4 |
| 365 | 6 | 15.0 | 0.4 |
| 370 | 6 | 16.5 | 0.4 |
| 375 | 6 | 18.3 | 0.3 |
| 380 | 6 | 20.5 | 0.3 |
| 385 | 6 | 23.1 | 0.3 |
| 390 | 6 | 26.4 | 0.2 |
| 395 | 6 | 30.6 | 0.2 |
| 400 | 6 | 36.0 | 0.2 |
| 405 | 6 | 43.5 | 0.1 |
| 410 | 6 | 54.3 | 0.1 |

TABLE I-continued

| Distance between first and second bus bars [mm] | Width of passive (non-heatable) zone [mm] | Width of active (heatable) zone [mm] | Ratio (surface area passive zone/surface area of adjacent active zone) |
|---|---|---|---|
| 415 | 6 | 71.6 | 0.1 |
| 420 | 6 | 103.1 | 0.1 |
| 425 | 6 | 179.4 | 0.0 |
| 430 | 6 | 628.2 | 0.0 |

As shown in FIG. 2, when a voltage of 42 Volts is applied to the glazing the heat generated remains substantially constant at the portion of the glazing panel comprising active and passive zones.

Figure 3:
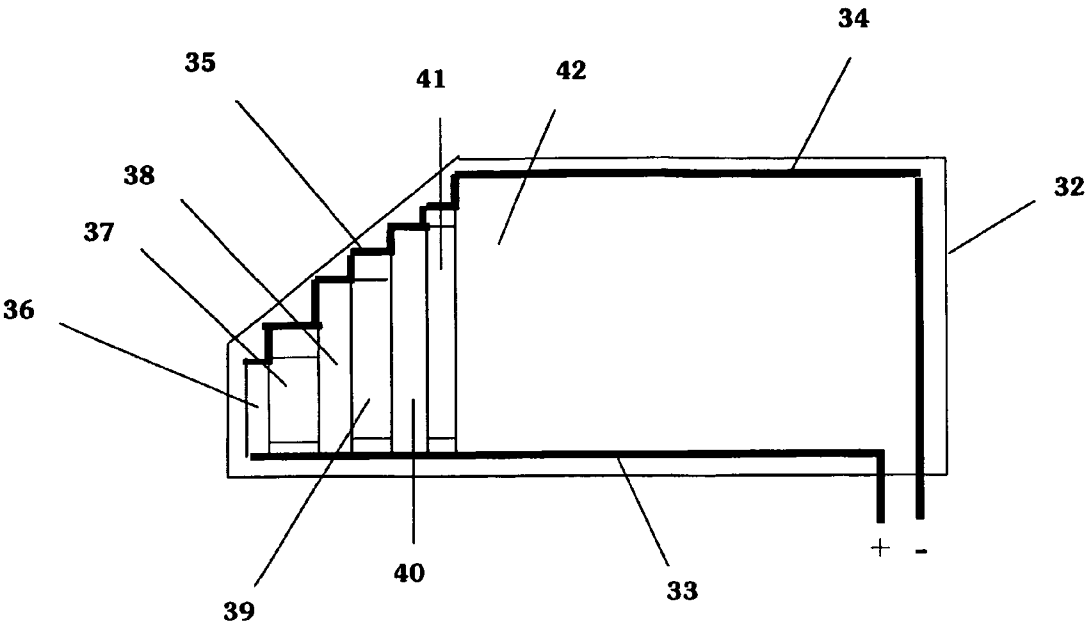
FIG. 3, FIG. 4, FIG. 5 and FIG. 6 which are alternative forms of glazing panels.

In the embodiment of FIG. 3, a glazing panel (32) comprises bus bars (33,34), interspaced active zones (36, 38, 40, 42) and passive zones (37, 39, 41), the bus bar (34) being provided with steps (35) along part of its length, in this case along part of the length where the bus bars (33, 34) diverge.

Figure 4:
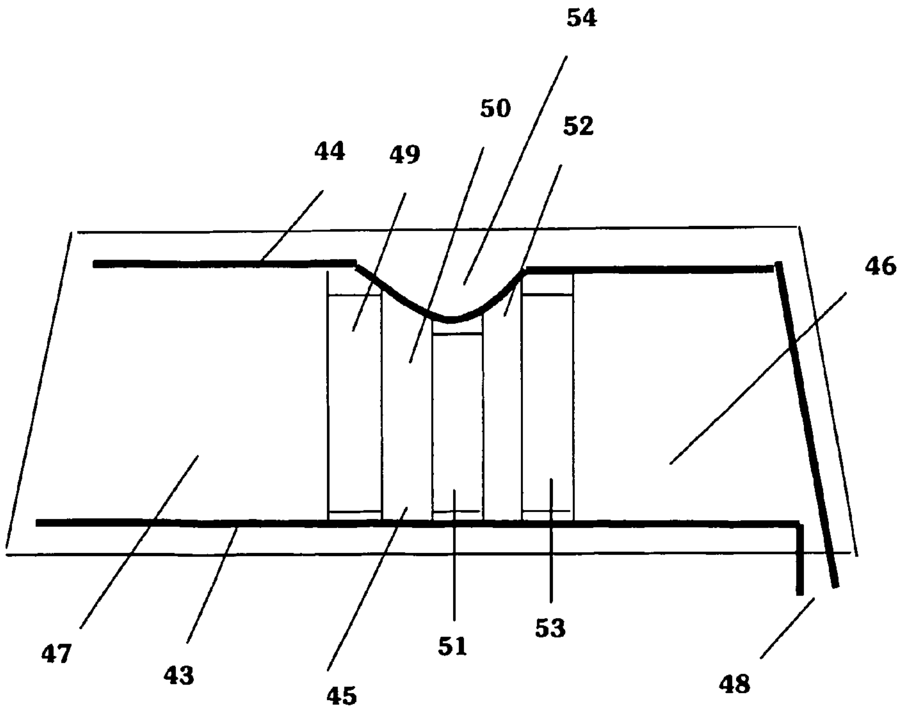

FIG. 4. shows an application of the invention with respect to a windscreen or rear screen in which bus bars (43,44) diverge at at least one portion along their lengths, in this embodiment between a central portion (45) of the glazing panel which is provided with interspaced active zones (50, 52) and passive coated zones (49, 51, 53) and each of the external portions (46,47) of the glazing panel comprising a single active coated zone. The bus bars (43, 44) are arranged for connection via a single connector (48) exiting from the glazing panel (as may also be the case with other embodiments) with a portion of bus bar (44) running along a non-coated portion on the glazing adjacent to a side edge of the glazing panel. This embodiment may be particularly useful when the glazing panel is provided with a non-coated portion (54), or for example a data transmission window to facilitate transmission of communication signals.

Figure 5:
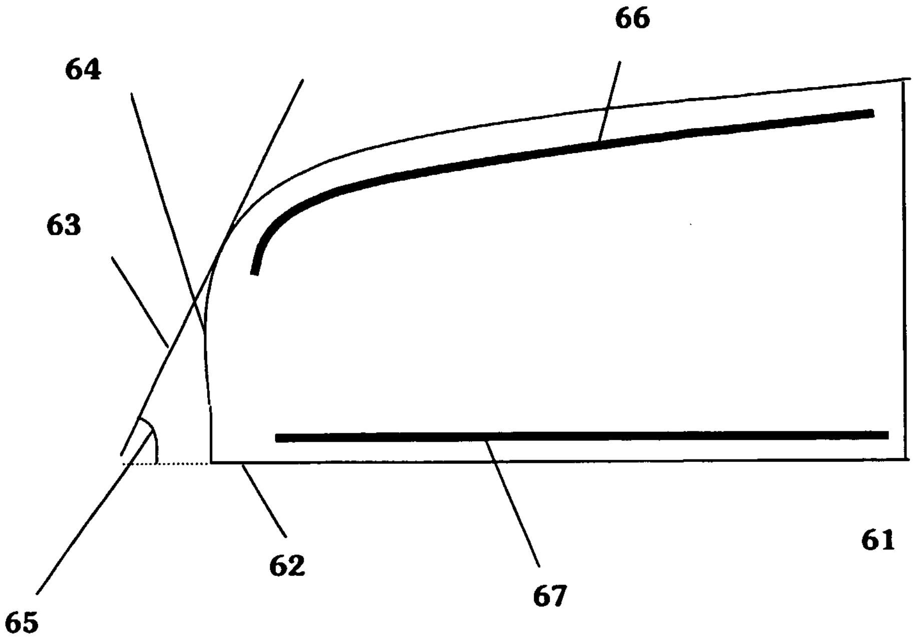

FIG. 5 shows a glazing panel of substantially irregular shape (61) comprising spaced bus bars (66, 67), which has an acute angle $\alpha$ (65) formed by the lower edge (62) of the glazing panel and by the tangent (63) to a side edge (64).

Figure 6:
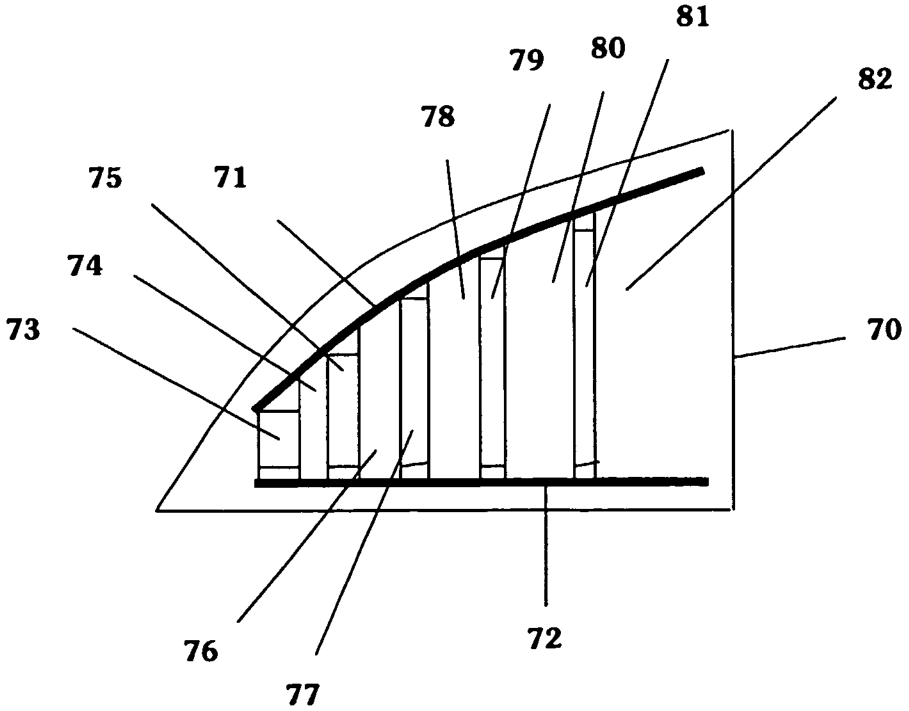

FIG. 6 shows an application of the invention with respect to a rear side window of a vehicle (70) of substantially triangular shape in which bus bars (71, 72) diverge at at least one portion along their lengths, which portion is provided with interspaced active zones (74, 76, 78, 80, 82) and passive coated zones (73, 75, 77, 79, 81).

The invention claimed is:

1. An electrically heatable glazing panel comprising:

a substrate, a substantially transparent, electrically conductive coating layer;

spaced first and second bus bars, in which at least part of the coating layer is adapted to be electrically heatable via the spaced first and second bus bars, in which the first and second bus bars are substantially non-parallel in diverging at least one portion along their lengths, and in which the coating layer comprises a plurality of zones comprising at least:

i) A first passive coated zone, which is adapted to be substantially non-heatable electrically; and ii) A first active coated zone which is adapted to be electrically heatable;

the active and passive zones being provided in the form of strips having substantially parallel sides along their lengths; and the first bus bar being provided at an upper edge of the glazing panel and the second bus bar being provided at a lower edge of the glazing panel.

2. An electrically heatable glazing panel according to claim 1 in which the coating layer is divided into a plurality of zones comprising at least:

i) A first passive coated zone, which is adapted to be substantially non-heatable electrically; and ii) A first active coated zone which is adapted to be electrically heatable; and iii) A second passive coated zone which is adapted to be substantially non-heatable electrically.

3. An electrically heatable glazing panel according to claim 1 in which the first active zone is adjacent to the first passive zone.

4. An electrically heatable glazing panel according to claim 1 in which the active and passive zones are delimited by one or more substantially insulating zone boundaries.

5. An electrically heatable glazing panel according to claim 4 in which the one or more zone boundaries is provided by non-coated portions of the glazing panel.

6. An electrically heatable glazing panel according to claim 1 in which at least one passive zone has a width of less than 20 mm.

7. An electrically heatable glazing panel according to claim 3 in which the width of at least one active zone is less than or equal to ten times the width of its adjacent passive zone.

8. An electrically heatable glazing panel according to claim 1 comprising a first glazing portion positioned between the first and second bus bars and having at least one active coated zone and an adjacent passive coated zone, a second glazing portion positioned between the first and second bus bars at a position at which the distance between the bus bars is greater than the distance between the bus bars at the first glazing portion, the second glazing portion having at least one active coated zone and an adjacent passive coated zone, and in which the ratio of surface area of the passive coated zone to the surface area of the adjacent active coated zone at the first glazing portion is greater than that at the second glazing portion.

9. An electrically heatable glazing panel according to claim 4 in which the one or more zone boundaries have a width of less than 150 μm.

10. An electrically heatable glazing panel according to claim 1 in which at least 50% of the surface area of the coating layer comprises active coated zones.

11. An electrically heatable glazing panel according to claim 1 in which the coating layer is a solar control coating layer.

12. An electrically heatable glazing panel according to claim 1 in which the coating layer has a resistance comprised between 2 and 25 ohms/square.

13. An electrically heatable glazing panel according to claim 1 in which the substrate is a glass sheet and in which the coating layer is provided at a surface of the glass sheet.

14. An electrically heatable glazing panel according to claim 1 in which the coating layer is provided on a flexible sheet, notably a PET sheet, which forms part of the glazing panel.

15. An electrically heatable glazing panel according to claim 1 in which the glazing panel is thermally toughened.

16. An electrically heatable glazing panel according to claim 1 in which the glazing panel is laminated.

17. An electrically heatable glazing panel according to claim 1 in which the glazing panel is an automotive side window.

18. An electrically heatable glazing panel according to claim 1 in which the glazing panel has at least one acute angle.

19. An electrically heatable glazing panel according to claim 18 in which the glazing panel is of substantially triangular shape.

20. An electrically heatable glazing panel according to claim 1 in which the variation in temperature across the active and passive coated zones is less than 15° C. when a voltage is applied across the coating layer via the first and second bus bars and after the glazing panel has reached equilibrium conditions with its surroundings, the surroundings being at room temperature.

* * * * *